Dec. 12, 1967 J. O. HRUBY, JR 3,357,643
SPRINKLER AND FOUNTAIN DEVICES
Filed July 6, 1965
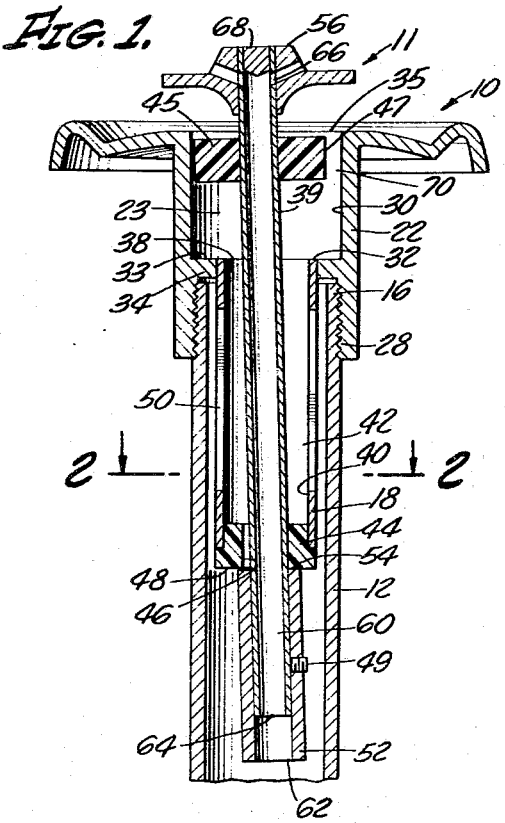
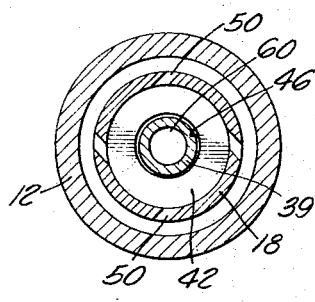
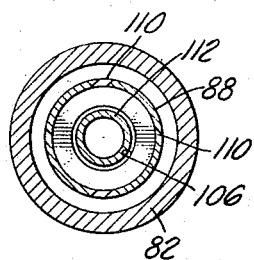
JOHN O. HRUBY, JR.
INVENTOR.
BY BEEHLER & ARANT
ATTORNEYS

# United States Patent Office 3,357,643
Patented Dec. 12, 1967

3,357,643
SPRINKLER AND FOUNTAIN DEVICES
John O. Hruby, Jr., Burbank, Calif., assignor, by mesne assignments, to Rain Jet Corp., Burbank, Calif., a corporation
Filed July 6, 1965, Ser. No. 469,788
3 Claims. (Cl. 239—210)

ABSTRACT OF THE DISCLOSURE

The invention relates to lawn sprinklers and ornamental water fountains. The structure is embodied in a riser which is connected to a source of water at the upper end of which is a sprinkler head. Within the riser is a tube extending throughout part of its length, in the sides of which are longitudinally extending apertures 50 directed on a bias inwardly toward the hollow interior of the tube. A stem 39 is located within the tube, extending through the bottom of the tube and the stem has on it a collar to keep the stem from being pushed out of position by water pressure when in operation. At the upper end of the stem is a disperser for water and below the disperser is a bushing which travels around a cylindrical inside track when water is supplied under pressure and passes through the apertures 50. The stem in operation is caused to gyrate so that the fountain of water which passes outwardly from the disperser travels in a gyrating path. Simultaneously water which has passed to the interior of the tube passes upwardly, is diverted by the lower surface of the bushing, and then flows out through the open space between the bushing and the surrounding cylindrical surface.

---

When viewed in a broad aspect, the invention represents an improvement over my U.S. Patent Nos. 3,030,028, 3,081,036 and 3,091,398, assigned to the assignee of this invention. The water devices disclosed in Patent No. 3,030,028 are characterized by a tubular stem which is caused to rotate on its axis and gyrate, the upper end of the stem having an upwardly directed passage, the outlet end of which is eccentric of the stem axis whereby the jet of water from the outlet passage traces an epicycloidal curve around the axis of the stem. The jet of water is broken up into individual droplets because of the epicycloidal movement of the outlet end of the outlet passage.

In U.S. Patent No. 3,081,036, there is taught the forming of concentric groups of jet producing passages, all of which trace epicycloidal curves, to provide fountain sprays of sparkling droplets in a predetermined design.

In U.S. Patent No. 3,091,398, the water distribution characteristics of lawn sprinklers are improved by making the water inlet capacity of the sprinkler body substantially greater than the outlet capacity of the discharge opening of the sprinkler body. By restricting the water outlet from the sprinkler body to a size substantially less than the water inlet, water will be discharged from the sprinkler body with greater force than otherwise and thereby will be sprayed to a greater distance around the sprinkler.

The invention here disclosed is a distinct improvement over the previously described fountains and water sprinklers. By providing a bushing member on the rotating and gyrating stem, the problems of excessive wear in the moving parts are lessened at no sacrifice in operating capability while at the same time providing for a structure which is easy to assemble.

A general object of this invention is to provide a new and improved water disperser suitable for lawn sprinklers and fountains of the above-mentioned character, which is simple and rugged in construction, reliable in operation, inexpensive to manufacture and capable of long life in the various forms, for use both indoors and outdoors.

Another object of the invention is to provide a new and improved water disperser suitable for lawn sprinklers and fountains of the character here under consideration wherein special means is provided to accommodate the combined gyratory and rotational operation of the vertical stem through which water passes wherein wear is minimized, thereby enabling the device to function more satisfactorily over longer periods of time.

Still another object of the invention is to provide a new and improved water disperser suitable for sprinklers and fountains wherein the bearings made use of to accommodate the gyratory motion are made larger in diameter in order to improve the ease with which the gyratory motion is accommodated.

Still another object of the invention is to provide a new and improved water disperser suitable for sprinklers and fountains wherein bearing surfaces which accommodate the gyratory motion are made of different materials, thereby making it possible to build into the device advantages which stem from the use of different materials, the structure moreover being such that the internal gyrating portion of the device can be entirely put together as a subassembly with the improved material made a part of it before being assembled with the remainder of the device.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a longitudinal cross-sectional view of a water disperser according to one embodiment of this invention;

FIGURE 2 is a cross-section of the water disperser taken on the line 2—2 of FIGURE 1;

FIGURE 3 is a longitudinal cross-sectional view of a water disperser according to this invention set up in the form of a fountain; and FIGURE 4 is a cross-section of the fountain taken on the line 4—4 of FIGURE 3.

Referring to the drawing in detail with particular reference to FIGURE 1 and FIGURE 2, there is shown a lawn sprinkler according to one embodiment of this invention. Certain structural features of the sprinkler resemble those disclosed in Patent No. 3,091,398.

A sprinkler head designated generally by reference numeral 10 is mounted atop a riser pipe 12 having an inside surface 14. The riser pipe 12 which is part of a lawn sprinkler installation is adapted to supply water to the sprinkler head. The upper end of the pipe is designated 16.

The sprinkler head 10 comprises a rigid tube 18 extending axially into the upper end of the riser pipe 12, and a casting 22 for mounting the body upon the upper end of the riser pipe. Within the sprinkler head 10 is a disperser assembly indicated generally by the reference character 11. The disperser assembly is built and mounted so as to gyrate and rotate within the sprinkler head. The rigid tube 18 is firmly attached to casting 22 by force-fitting or other conventional means. The casting 22 in turn is screw threaded at 28 for mounting sprinkler head 10 on the riser 12. There is a recess 23 within the casting 22 formed by the surface 30 in casting 22 and located above an end surface 32 of the rigid tube 18 and the upper surface 33 of an interior annular flange 34. As can be seen in FIGURE 1, an upper end opening 35 of the recess 23 is substantially larger than a discharge opening 38 of rigid tube 18. The opening 38 is substantially larger than a stem 39 of the disperser 11 and the disperser 11 is therefore free to gyrate and rotate during operation.

Numeral 40 designates the inside cylindrical surface of the rigid tube 18, such inside surface defining a bore 42. A bearing sleeve 44 is force-fitted in the lower or inner end of the rigid tube 18, the bearing sleeve 44 having a cylindrical bore 46 extending axially therethrough. The bore 46 is slightly larger than the outside diameter of the stem 39 to allow stem 39 to rotate and gyrate. The lower end face 48 of the bearing sleeve 44 defines the lower end of the sprinkler head 10. The bearing sleeve 44 is shown as being formed of a synthetic plastic resin material such as a laminated phenolic composition.

Formed in the side wall of rigid tube 18 are a plurality of apertures 50 for admitting water into the tube cavity from the riser 12. These apertures 50 have the form of narrow slits which extend longitudinally of the tube. There are four such slits in the illustrated embodiment, the slits being in a circumferentially arranged series and uniformly spaced apart. As best shown in FIGURE 2, these slits extend through the wall of the tube 18 at an angle with respect to a radial direction, thereby to cause water in the tube to spiral or rotate around and upwardly in the bore 42 and out through the discharge opening 38.

The stem 39 is arranged longitudinally in the bore 42, the stem extending upwardly beyond the discharge opening 38 and downwardly through the lower cylindrical bore 46 of the bearing sleeve 44. As stated previously, the cylindrical bore 46 is only slightly larger in diameter than the stem 39, but enough so that the bore 46 will accommodate rotation of the stem on its longitudinal axis and sufficient inclination of the stem 39 with respect to the axis of the bore 42 to permit the disperser to assume the position shown in FIGURE 1.

A bushing member 45, made of an acceptable synthetic plastic resin material such as a laminated phenolic composition, is anchored by substantially conventional means to the exterior of the stem 39 near but below the top.

The outside circumference of the bushing member 45 is of relatively large diameter and the thickness of the bushing member 45 is also appreciable, thereby to provide a relatively large bearing surface 47 of low-friction character. The inside diameter of the surface 34 of the recess 23 is relatively larger in diameter than the exterior diameter of the bushing member 45 so as to permit the degree of tilt illustrated. Since the casting 22 is preferably of metallic material, the casting will provide a metal surface, constituting the surface 30, in a position for rotating engagement with the bearing surface 47 which is a non-metallic material.

At the lower or inside end of the stem 39 is a collar 52 forming a stop means. The collar is affixed to the stem 39 by means of a set screw 49 to prevent removal of the stem outwardly through the recess 23. The stem is, however, movable longitudinally in the bore 42. The embodiment of the invention of FIGURE 1 may therefore be described as a "pop-up" type lawn sprinkler, i.e., when water is turned into the system, the stem moves upwardly to the position shown in FIGURE 1 as a result of pressure created by the force of water flowing through the sprinkler head 10. The extent of upward movement of the stem in the body is limited by engagement of the upper end surface or shoulder 54 of the collar 52 against the lower end face 48 of the bearing sleeve 44.

A stem head 56 is fastened on the upper end of the stem 39 and is larger in diameter than the discharge opening 38 of body tube 18 and larger also than the opening 35 in casting 22. When water flowing through the device is turned off, the stem 39 will drop down into the sprinkler head to a position wherein the stem head 56 will cover the opening 35. The bushing member 45 being larger in diameter than discharge opening 38 will cover the opening 38. In the lowered position, the stem head 56 will be less susceptible to damage from traffic over the lawn.

The stem 39 of FIGURE 1 is tubular with reference numeral 60 designating its axial passage or bore. Water enters stem 39 through the open end 62 of the collar 52 and then into the bore 60 through an open end 64 of stem 39.

The upper end of the stem has a plurality of orifices 66 which extend through the stem head 56. A plug 68 closes the upper end of the stem. Water passes upwardly in the stem and out through the orifices 66 in streams radially outward and slightly upward from the sprinkler head. Water from the bore 42 is forced upwardly through discharge opening 38 into the recess 23. The water then passes around one side or the other of the bushing member 45 through an opening 70 formed between the surface 30 and the bushing 24. As in the case of the bearing sleeve 44, bushing member 45 is preferably made of a synthetic plastic resin material as, for example, a laminated phenolic composition.

In the operation of the device, the swirl of water around and upwardly through bore 42, because of the slant of the water inlet aperture 50, will cause the stem 39 to gyrate around in the body with the axis of the stem being inclined with respect to the axis of the bore 42. In being so gyrated, a lower portion of the stem contacts the surface which defines cylindrical bore 46 while the outside surface of bushing member 45 will contact the surface 30.

The improvement provided by this invention resides in utilizing a bushing member of relatively large diameter mounted on the upper end of the stem. The bushing 45 as disclosed is easy to install on stem 39 and, since the bushing member is non-metallic, all wearing of the top portion is confined to the bushing member 45 rather than the stem. Also, since there is no bearing on the wall of the discharge opening 38, the discharge opening offers less restriction to the passage of both water and dirt which may be present in the system.

Referring now to FIGURE 3 and FIGURE 4, a water fountain according to this invention is shown in detail. The fountain device, designated generally as 80 receives water from a vertical riser pipe 82 upon which it is mounted. The fountain 80 produces a spray having low, high and intermediate jets.

Fountain device 80 comprises a subassembly 84 extending axially into the upper end of the riser pipe 82, and a nipple 86 for securing the subassembly upon the riser pipe 82. The subassembly 84 comprises a rigid tube 88 and a collar or nut 90 around the upper end of the tube, the tube being force-fitted or otherwise secured in the collar. The collar is screw-threaded at 92 for securing the collar in the nipple, the nipple being internally screw-threaded at 94 for mounting the subassembly on the riser pipe. The rigid tube 88 is of smaller outside diameter than the inside diameter of riser pipe 82 to provide an annular space 96 around the tube.

Numeral 98 designates the inside cylindrical surface of tube 88 and defines a cavity or bore 100. A water discharge opening 102 is located at the upper end of the tube 88.

A bearing sleeve 104 is force-fitted in the lower end of the tube 88, the bearing sleeve having a cylindrical bore or cavity 106 extending axially therethrough. A lower end face 108 defines the lower end of the subassembly 80. The bearing sleeve 104 is shown as being formed of synthetic plastic resin material as, for example, laminated phenolic composition.

Formed in the side walls of tube 88 are apertures 110 shown as four in number (see FIGURE 4) for admitting water into the subassembly from the riser pipe. These apertures are in practice narrow slits which extend longitudinally. As best shown in FIGURE 4, these slits extend through the wall of tube 88 at an angle with respect to the radii of the bore 100, thereby to cause water in the bore cavity to spiral around and upwardly in the bore and out through the discharge opening 102 in a manner similar to that shown in the embodiment of FIGURE 1 and FIGURE 2.

The rotary jet producing member of the fountain includes a tubular stem 112, a stem head here having the form of a sleeve 114 on the upper end of the stem, a bushing 118 and a collar 116 on the lower end of the stem, the collar being secured by a set screw 117. The stem is arranged longitudinally in the bore 100 and extends upwardly through the discharge opening 102 and downwardly through the lower bore 106 of the bearing sleeve. The stem is substantially smaller in outside diameter than the discharge opening 102. The bore 106 of the bearing sleeve 104 is only slightly larger in diameter than the stem, enough so that the bore will accommodate rotation of the stem on its longitudinal axis and sufficient inclination of the stem with respect to the axis of the bore 100 to permit engagement of the bushing 118 with an inside wall surface 120 of the collar 90. Below the sleeve 114 is a recess 122, at the upper end of which is a discharge opening 124.

The stem 112, together with the sleeve 114 and collar 116, moves axially in the subassembly 84 upwardly to the position shown in FIGURE 3 as the result of pressure caused by the flow of water through the subassembly. The collar 116 limits the extent of upward movement by the engagement of collar 116 against the face 108 of bearing sleeve 104. Shown at 128 is the axially extending bore of the stem 112 which has a lower end inlet opening 130.

At the upper end of the sleeve 114 is a plug 127 which is force-fitted or otherwise secured in place. The plug 127 has passing through it angularly directed discharge tubes 131 and a central discharge tube 132. The tubes may vary in number and direction to suit various different water patterns.

Bushing 118 shown as a laminated phenolic composition is force-fitted on sleeve 114 and helps to retain sleeve 114 on stem 112. More importantly, however, the function of bushing 118 is to provide a low-friction bearing surface of relatively large diameter for the fountain device at its upper end as the stem both gyrates and rotates. As shown in FIGURE 3, the bushing 118 contacts the surface 120 during the operation of fountain device 80. As in the description of FIGURE 1, this provides many advantages over those known in the art.

While the instant invention has been shown and described herein in what is conceived to be the most practical and preferred embodiments, it is recognized that departures may be made therefrom within the scope of this invention, which is therefore not to be limited to the details disclosed herein, but is to be accorded the full scope of the claims appended hereto.

Having described the invention, what is claimed as new in support of Letters Patent is:

1. A water disperser comprising a body adapted to be mounted on a water supply riser, said body comprising a tube smaller in diameter than said riser and means connecting the tube to the riser in position wherein a lower end of the tube extends into and is spaced from the interior of the riser, said tube having vertically elongated oblique apertures through the wall thereof for passage of water, said tube having an upper end exposed above said riser, and a gyrating disperser head assembly rotatably and gyratably mounted in said body, said head assembly comprising a stem head, a hollow stem extending into and attached to said stem head, and water passage means from the interior of said stem head to the exterior, a stationary cylindrical interior bearing surface having an outside end exposed to the exterior on the upper end of said body and larger in diameter than the inside diameter of said tube, and a bushing mounted on the stem head, said bushing having an outside diameter larger than the outside diameter of said stem and smaller in diameter than the inside diameter of said cylindrical interior bearing surface, whereby said bushing comprises simultaneously a bearing and gyrating water deflector, said tube having a second bearing surface adjacent the inner end of said stem, said bushing being adapted to roll about the bearing surface of said body during operation.

2. A water disperser comprising a body adapted to be mounted on a water supply riser, said body comprising a tube smaller in diameter than said riser and means connecting the tube to the riser in position wherein a lower end of the tube extends into and is spaced from the interior of the riser, said tube having vertically elongated oblique apertures through the wall thereof for passage of water, said tube having an upper end exposed above said riser, and a gyrating disperser head assembly rotatably and gyratably mounted in said body, said head assembly comprising a stem head, a hollow stem extending into and attached to said stem head, and water passage means from the interior of said stem head to the exterior, a stationary cylindrical interior bearing surface on the upper end of said body having an outside end exposed to the exterior and larger in diameter than the inside diameter of said tube, and a bushing mounted on the stem head, said bushing having an outside diameter larger than the outside diameter of said stem and smaller than the inside diameter of said interior cylindrical bearing surface whereby said bushing comprises simultaneously a bearing and a gyrating water deflector, said tube having a second bearing surface adjacent the inner end of the stem, and bushing being of a synthetic plastic resin material having a low friction bearing surface, the bearing surface of said body being of a metallic material, said bushing being adapted to roll about the bearing surface of said body during operation.

3. A water disperser as in claim 1 wherein said outside diameter of the bushing is larger than the inside diameter of said tube thereby partially blocking the path of water passing from said tube to the exterior.

References Cited

UNITED STATES PATENTS

| | | | |
|---|---|---|---|
| 3,301,490 | 1/1967 | Hruby | 239—17 |
| 2,589,942 | 3/1952 | Hruby. | |
| 2,639,191 | 5/1953 | Hruby. | |
| 2,974,877 | 3/1961 | Hruby | 239—206 X |
| 3,091,398 | 5/1963 | Hruby | 239—206 |
| 3,175,767 | 3/1965 | Hruby | 239—17 |

M. HENSON WOOD, JR., *Primary Examiner.*

VAN C. WILKS, *Assistant Examiner.*